Patented Nov. 2, 1937

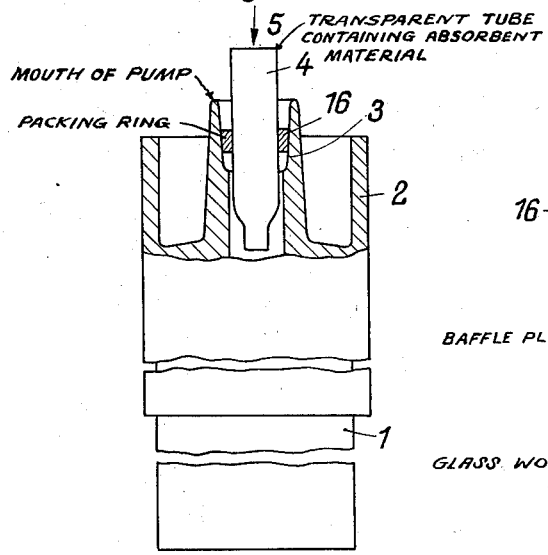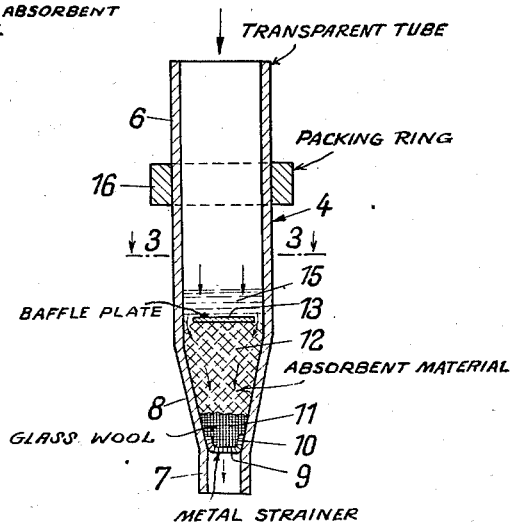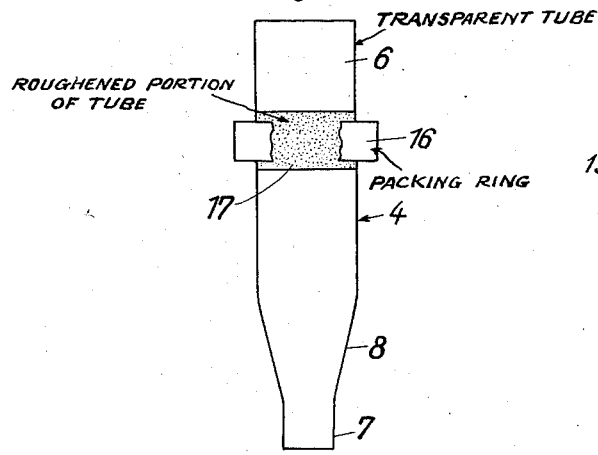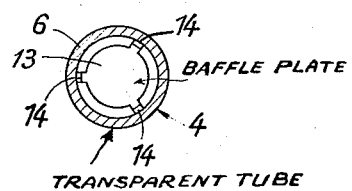

2,097,650

UNITED STATES PATENT OFFICE 2,097,650

DEVICE FOR DETECTING THE PRESENCE OF FOREIGN GASES OR SUSPENSIONS IN AIR OR GASEOUS MEDIUM

Gerhard Karl Emil Heinrich Stampe, Lubeck, Germany, assignor to Otto Heinrich Drager, Lubeck, Germany Application July 8, 1935, Serial No. 30,372
In Germany July 14, 1934

6 Claims. (Cl. 23—254)

This invention relates to a device for detecting the presence of foreign gases or suspensions in air, gas or generally in a gaseous medium.

In the co-pending patent application Serial No. 734,417 of Franz Hollmann, which has matured into Patent No. 2,069,035 a device is disclosed comprising a double-acting gas pump and a container such as a tube carried by said pump and having a detecting medium therein. This invention relates to an improvement of said testing tube or container and to the special arrangement of the testing medium and correlated parts within said tube or container.

One object of the invention is to provide for means adapted to direct or deflect the flow of the gaseous medium containing the gas to be detected towards and through one portion only of the cross section of the testing tube's adsorbing layer. Preferably the air is by these means forced through an annular portion at the periphery of the adsorbing layer, thus enabling the gas to be detected to be concentrated adjacent the wall of the tube.

Another object of the invention is to hold the adsorbing layer in place in such a manner as to prevent dislocation of the material forming it and the formation of channels or the like in it through which the gaseous medium may leak without contact with the adsorbing material.

In the drawing one form of construction of the device is shown by way of example.

Fig. 1 shows the general arrangement of the detecting tube in connection with an air pump contrived to force air or gas to be tested through a detecting medium.

Fig. 2 is a section along the longitudinal axis through said tube which is shown on a larger scale.

Fig. 3 is a cross section according to line 3—3 of Fig. 2 seen in the direction of the arrows.

Fig. 4 is a side view of the detecting tube a portion being broken away.

The air pump shown in Fig. 1 may be similar to the modification shown in Fig. 3 of the copending patent specification Serial No. 734,417 of Franz Hollmann which has matured into Patent No. 2,069,035. So it may be a double acting pump 1 of a comparatively small, portable and manually operable type which will give a substantially constant flow of a gaseous medium such as air. In the mouth-piece 2 the testing tube is inserted. For this purpose said mouth-piece is preferably tube-shaped. The air or gas to be tested is flowing into the pump from outside through the detecting tube which is mounted in a supporting portion 3 of said mouth-piece 2 (shown in section in Fig. 1) in the form of a small container. The direction of flow of air or gas into said testing tube 4 is designated in Figs. 1 and 2 by arrow 5.

The outer part 6 of the testing tube 4 is cylindrical. The innermost end 7 is also cylindrical but of smaller diameter than part 6. Both parts are connected by a tapering portion 8. This inner end of tube 4 may be constructed in any other suitable manner. It is essential only that the inner end of it be of smaller cross section than the outer end.

The tube or container 4 may be made of any kind of suitable material. It is either transparent as a whole or only in part. To this point reference will be made later on in this description.

Near the inner end of tube 4 a supporting member is held in place which is of suitable material and is permeable by air and gas. A metal strainer 9 may be used filling out the entire inner cross section of testing tube 4 near its inner end. This strainer has preferably an upturned rim 10 so that it has as a whole the appearance of a small basket. The strainer is preferably provided with a coating of copper or it may be made entirely of copper. The strainer serves as a support for a resilient layer 11 which may partly fill the space inside of the "basket". This layer may consist of glass wool.

On this resilient layer rests a layer 12 having gas adsorbing qualities. This layer preferably consists of a suitable granular material e. g. silica gel. On the top of layer 12 a device is arranged which is adapted to direct the flow of the gaseous medium through one portion only of the cross section of the adsorbing layer 12, preferably through an annular portion at the periphery of said cross section. In the modification shown a plate 13 is used which may be made of any suitable material such as metal. This plate is of circular shape of smaller diameter than the inner diameter of the tube 4 at that part where the plate is held. Plate 13 is provided at the edge with distance pieces 14 three of which are shown in Fig. 3. These may be constructed in such a manner that they are horizontal and provided with edges either turned up or down and resting against the inner wall of tube 4.

Thus it is assured that the annular space left between the plate 13 and the adjacent part of the inner wall of tube 4, is not changed during the operation of the device but remains substantially constant having the same size and shape.

Any other suitable means for securing this object may be used. Instead of the plate 13 likewise any other suitable means directing the flow of gaseous medium to be tested towards the periphery of the cross section of the tube may be employed.

The plate 13 is covered with material 15 which may be arranged as one layer or may consist of two layers. This layer 15 has the object of forming a closure at the top of the adsorbing layer 12. It is of advantage if this layer 15 is resilient. It further preferably is of such a nature as to have purifying qualities and may retain foreign matter contained in the gaseous medium. Both these qualities are found in glass wool which preferably is used for forming layer 15.

A packing ring 16 surrounds the portion 6 of the testing tube 4 which ring may consist of rubber. This ring holds the tube 4 tightly in the portion 3 (Fig. 1) of the mouth-piece 2 of the pump. The outer surface of part 6 of tube 4 preferably is prepared in such a manner as to be able to prevent shifting of said rubber ring 16. This object may be obtained by roughening an annular portion 17 of said outer surface as a whole or at least partly.

The gaseous medium, e. g. air, to be tested with the view of finding out whether any foreign or noxious gases are contained therein, is sucked through the testing tube 4 in the direction of the arrows. It first flows through the layer or layers 15 and is then deflected towards the periphery of the tube by the plate 13. Therefore, it flows through the adsorption layer 12 mainly at the periphery i. e. on that portion of this layer situated adjacent the wall of the tube. Therefore, the gases to be detected and contained in said gaseous medium are concentrated in said portion of the adsorption layer 12 near the wall of the tube. When, therefore, a suitable reagent—the qualities of which are chosen in conformity with the gas to be detected—is introduced into the adsorptive layer 12 that part of it near the wall of the tube where the gas to be detected has been concentrated, will be changed in color so that the presence of the gas in question is announced.

As said above, the testing tube 4 may be transparent as a whole. It is only necessary, however, to make that portion of it transparent in which the adsorption layer 12 and the deflecting plate 13 is contained. Only at that portion is it necessary to make the contents of the tube 4 visible to the onlooker.

The arrangement of the parts shown and described is particularly adapted to hold and retain the usually granular adsorbing material 12 in place. The resilient layer 11 and the layer 15—if resilient—protect the adsorbing layer 12 against vibrations or the like which might have the effect of displacing the material of layer 12 and of forming channels through it.

I claim:—

1. Device for use in detecting gas comprising a container capable of having gas flow therethrough, a layer of material within said container adapted to adsorb the gas to be detected, a plate for deflecting the flow of gaseous medium containing the gas to be detected, said deflecting plate provided with means engaging the inner wall of said container and holding said plate in front of the central part of said adsorbing layer leaving free only a peripheral annular portion whereby the said gaseous medium is directed towards and through the said peripheral annular portion of the adsorbing medium.

2. Device for use in detecting gas, comprising a manually operable and portable pump, a testing tube fixed in one part of said pump and in operative relation therewith, a layer of adsorptive material within said tube, said tube being transparent at least at the part containing the adsorptive material, a plate covering said adsorptive layer only as to its central part leaving uncovered a peripheral annular portion, means for holding said plate in place, supporting means for said adsorptive layer, said supporting means including a resilient layer.

3. Device for use in detecting gas, comprising a manually operable and portable pump, a testing tube fixed in one part of said pump and in operative relation therewith, said tube having one end of smaller diameter than the other end, a strainer resting within said tube near the end of smaller diameter, a resilient layer carried by said strainer, an adsorptive layer on top of said resilient layer, means covering the central portion only of said adsorptive layer, a resilient layer on top of said covering means, said tube being transparent at least at the part containing the adsorptive material.

4. In a device as claimed in claim 3 a packing ring surrounding the testing tube and fitting tightly in the part of the pump holding said tube.

5. In a device as claimed in claim 3, a packing ring surrounding the testing tube and fitting tightly in the part of the pump holding said tube, the outer surface of said tube being adapted to prevent shifting of said packing ring.

6. A device for use in detecting gas comprising a tubular container capable of having gas flow therethrough, at least one transparent section in said container, a layer of material for adsorbing the gas to be detected disposed within said container adjacent to said transparent section, baffle means so placed as to force the flow of a gaseous medium containing the gas to be detected toward and through a portion at the periphery of the adsorbing layer adjoining and visible through said transparent section.

GERHARD KARL EMIL HEINRICH STAMPE.